Patented May 16, 1950

2,507,773

UNITED STATES PATENT OFFICE 2,507,773

PROCESS FOR TREATING WOODEN BATTERY SEPARATORS

Eduard Farber, Washington, D. C., assignor, by mesne assignments, to Evans Products Company, Detroit, Mich., a corporation of Delaware No Drawing. Application February 26, 1948, Serial No. 11,321

4 Claims. (Cl. 136—150)

The present invention relates to a process for preparing wooden battery separators for the well-known, lead-sulfuric, acid-type storage batteries.

It is the purpose and object of the invention to provide a simplified process which can be carried out in far less time than heretofore required with less consumption of treating reagent and with the production of high quality battery separators.

As is recognized in the art it is necessary in the preparation of wooden battery separators for use in lead sulfuric acid-type storage batteries to remove those substances from the wood which would otherwise be dissolved by the sulfuric acid in the battery as well as those substances which cause objectionable resistance to the passage of ions through the wood separator. The customary method of preparing wooden battery separators consists in treating them with hot solutions containing sodium hydroxide in concentrations between 1 percent and 5 percent by weight of the solution, usually about 3 percent. When such solutions are employed at ordinary pressures, exceedingly long periods of treatment are required. Additionally, the consumption of sodium hydroxide is relatively high especially when the more concentrated sodium hydroxide solutions are used. Long periods of water washing to remove absorbed alkali from the treated separators are required following the extraction step.

The disadvantages inherent in the above-described conventional prior art method can be largely overcome in accordance with the present invention by initiating the extraction step with a very weak solution of sodium hydroxide, that is, one containing sodium hydroxide in a concentration of about 0.1 percent by weight of the solution and in thereafter progressively adding additional sodium hydroxide to the extracting solution during a substantial part of the total extracting period. In this manner, the total concentration of free sodium hydroxide present in the extracting solution at any stage during the extraction process is maintained at a low level. By progressively supplying fresh sodium hydroxide during the period in which the acid-forming materials are generated from the wood, the consumption of sodium hydroxide through neutralization is greatly reduced as compared to the amount consumed through neutralization when the extraction is initiated with a concentrated sodium hydroxide solution. Additionally, it has been found that the progressive addition of sodium hydroxide during the extraction period reduces the overall time necessary to complete the extraction. Furthermore, inasmuch as there is present only a small excess of alkali, the water washing following extraction can be performed in a relatively short time.

It has been found that satisfactory results are obtained by keeping the concentration of free sodium hydroxide in the treating solution substantially below 1 percent by weight of the solution at all stages of the extraction treatment. In practice, the rate at which acidic materials are generated from the wood can readily be established in test runs on any particular wood samples and an appropriate schedule for the progressive addition of sodium hydroxide to the extracting solution established for the particular wood to be treated.

The free sodium hydroxide may be measured by titration of the alkalinity in the solution, deducting the value found for salts of volatile acids, mainly carbonate, as is done in the usual manner. While the theory underlying the success of the process is not fully appreciated, it is believed that the excess alkali present, when concentrated solutions of sodium hydroxide are employed, exerts a salting-out effect on the colloidal materials to be extracted from the wood, which effect appears to be particularly pronounced because of the absorption of alkali by the wood. During prolonged treating time, it is believed that certain secondary reactions also occur which are not essential for the extraction process itself, and that the secondary reaction products either by hydrolysis, oxidation, or saponification cause consumption of additional free sodium hydroxide.

It has been found that it is usually sufficient to maintain the free sodium hydroxide in the solution at a concentration of not more than about $1/10$ normal, or 0.4 percent by weight of the solution. This control over the concentration by free sodium hydroxide in the solution can be maintained by adding the sodium hydroxide to the solution at approximately the rate at which it is neutralized by the acid-forming extractives which are generated from the wood.

Preferably, the sodium hydroxide is prepared in the form of a concentrated solution, small increments of which are added progressively to the extracting solution. The addition may either be continuous or at suitable intervals.

The following illustrated example is given by way of exemplification of the process. The extraction of wooden battery separators cut from Douglas fir is initiated with water containing 0.1 percent sodium hydroxide. At intervals of fifteen minutes, additional sodium hydroxide in the form of a 40 percent concentration solution is added. The amount of the 40 percent concentration solution added being adjusted so that the quantity of free sodium hydroxide added to the extracting solution at each interval will be 0.1 percent by weight of the original treating solution. After the first hour of the extracting treatment, the rate of addition of sodium hydroxide is increased to 0.15 percent by weight. With five additions of increments of 0.1 percent and four additions of 0.15 percent each, the total amount of free sodium hydroxide added would, ignoring consumption of any portion thereof, produce a concentration of 1.1 percent of free sodium hydroxide. Due, however, to the generation of acidic material from the wood, the actual concentration of free sodium hydroxide is found never to exceed 0.4 percent by weight of the treating solution and drops down to about 0.2 percent near the end of the extraction period.

When eight pounds of treating solution are used for each pound of wood battery separators treated, the total amount of alkali added, according to the above-indicated schedule, will be 8.8 percent by weight of the wood treated and the total amount of sodium hydroxide neutralized by the acidic materials generated from the wood will be about 7.2 percent by weight of the wood. When employing the amounts of solution and the schedule of additions of sodium hydroxide as set forth in the above example, a period of from three to four hours is sufficient to complete the extraction step. At the completion of the extraction step, the solution containing the extractives is removed and water then added for washing the separators. Four water washes with boiling water, allowing about one hour for each wash, have been found entirely adequate to remove the alkali and extractives from the separators. In this process, about 27 percent of the original wood substance is dissolved and separators having a specific resistance of about 0.050 ohm per square inch are obtained.

It has been found that when solutions of lower concentration than indicated in the foregoing example are employed, the extraction is incomplete and, therefore, lower concentrations of sodium hydroxide in the extracting solution are not recommended.

In a comparative test, wood battery separators from the same source as those employed in carrying out the foregoing example were treated with a boiling solution containing 3 percent by weight of sodium hydroxide. Eight hours' extraction time at a boiling temperature was required to complete the extraction and six hours were required for washing the treated separators in order to yield separators having a specific resistance comparable to that possessed by the separators produced when carrying out the process in accordance with the present invention. Furthermore, the amount of sodium hydroxide neutralized during the eight hour period when employing a 3 percent by weight sodium hydroxide concentration was about 9.6 pounds per 100 pounds of the wood battery separators treated. For practical purposes, the amount of sodium hydroxide spent is considerably greater than that indicated by the above figure for the amount neutralized since the alkalinity remaining in the treating solution will usually be lost.

Having thus described my invention, I claim:

1. The improved method for extracting wood battery separators with extracting solutions of sodium hydroxide, comprising initiating the extracting treatment with a hot solution containing about 0.1 percent by weight of sodium hydroxide and thereafter adding sodium hydroxide to the solution during the extracting period in such amounts as will keep the concentration of sodium hydroxide in the solution within the limits of 0.1 percent to 1.0 percent by weight.

2. The improved method for extracting wood battery separators with extracting solutions of sodium hydroxide, comprising initiating the extracting treatment with a hot solution containing about 0.1 percent by weight of sodium hydroxide and progressively adding sodium hydroxide to the solution during the extraction period at approximately the rate at which sodium hydroxide is neutralized by the acid-forming extractives generated from the wood to maintain the sodium hydroxide concentration in the solution substantially constant.

3. The method of claim 2 characterized in that sodium hydroxide is added to the extracting solution at such a rate that the concentration of sodium hydroxide in the extracting solution remains throughout the extracting step substantially below 1 percent.

4. The method of claim 2 characterized in that sodium hydroxide is added to the extracting solution at such a rate that the concentration of sodium hydroxide in the extracting solution never substantially exceeds 0.4 percent.

EDUARD FARBER.

REFERENCES CITED

The following references are of record in the file of this patent:

UNITED STATES PATENTS

| Number | Name | Date |
|---|---|---|
| 1,566,118 | Rawling | Dec. 15, 1925 |
| 1,566,826 | Chamberlain | Dec. 22, 1925 |
| 1,871,171 | Gould | Aug. 9, 1932 |
| 2,169,473 | Olsen | Aug. 15, 1939 |
| 2,466,290 | Wells | Apr. 5, 1949 |

OTHER REFERENCES

Vinal, G. W.: Storage Batteries, 2nd ed., 1930, page 45.